Figure 1:
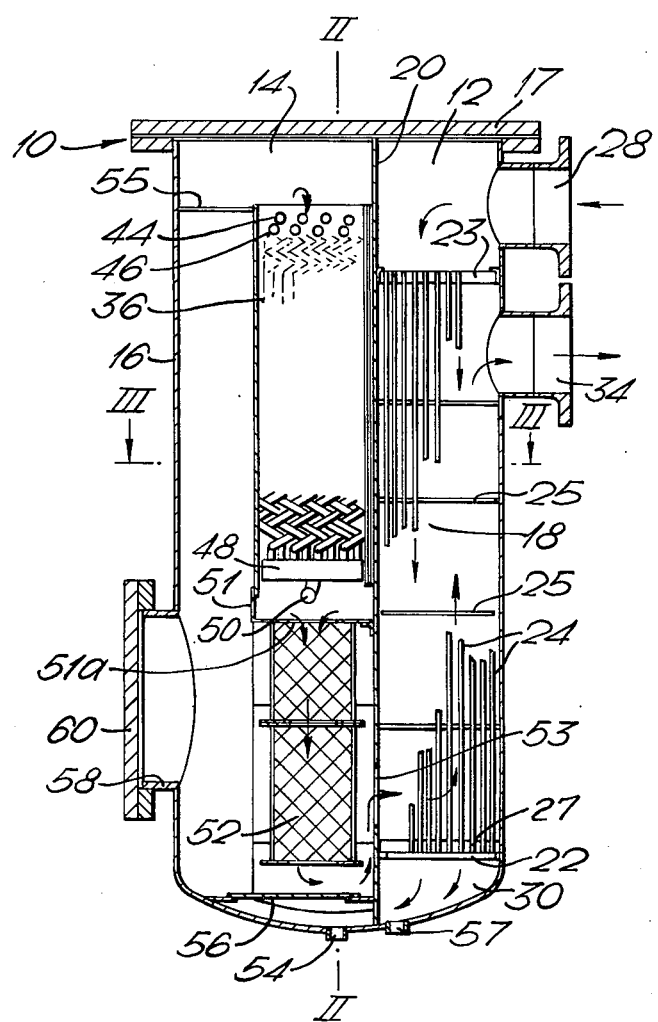

United States Patent [19]

Bruhl

[11] 4,027,729

[45] June 7, 1977

[54] DEVICE FOR CHILL-DRYING A GAS

[76] Inventor: Peter Brühl, Fehmarnstr. 1, 4 Dusseldorf-Nord, Germany

[22] Filed: July 15, 1974

[21] Appl. No.: 488,798

[30] Foreign Application Priority Data

July 13, 1973 Germany .................... 7325183[U]

[52] U.S. Cl. .................................. 165/111; 62/90; 62/93; 62/317
[51] Int. Cl.² .......................................... F28B 1/00
[58] Field of Search ................. 165/111; 62/90, 93, 62/317

[56] References Cited

UNITED STATES PATENTS

| | | | |
|---|---|---|---|
| 2,790,507 | 4/1957 | Hankison | 62/93 |
| 3,453,809 | 7/1969 | Henderson | 165/66 |
| 3,541,807 | 11/1970 | Henderson | 62/90 |
| 3,797,565 | 3/1974 | Fernandes | 62/93 |
| 3,899,023 | 8/1975 | Zander et al. | 165/111 |

*Primary Examiner*—Albert W. Davis, Jr.
*Assistant Examiner*—Sheldon Richter
*Attorney, Agent, or Firm*—Lerner, David, Littenberg & Samuel

[57] ABSTRACT

A device for chill-drying a gas comprising a gas/gas heat-exchanger and a gas/cooling medium heat-exchanger located within a pressure vessel such that the heat-exchangers define channels between themselves and the walls of the vessel, which channels connect a gas outlet at the bottom of the gas/gas heat-exchanger with a gas inlet at the top of the gas/cooling medium heat-exchanger. The pressure vessel is cylindrical and the gas/gas heat-exchanger has a curved surface lying against the inner surface of the pressure vessel, and a planar surface abutting against the gas/cooling medium heat exchanger which has a rectangular cross-section and its corners remote from the gas/gas heat exchanger abutting against the walls of the pressure vessel. A filter is positioned beneath the gas/cooling medium and pre-filters are located in the said channels, the arrangement being such that the gas to be treated flows through the gas/gas heat-exchanger via a plurality of tubes, through the channels, through the gas/cooling medium heat-exchanger, through the filter, and finally back through the gas/gas heat-exchanger via the interstices between the said tubes.

5 Claims, 3 Drawing Figures

DEVICE FOR CHILL-DRYING A GAS

This invention relates to a device for chill drying a gas, such as air, including a gas/gas heat-exchanger and a gas/cooling medium heat-exchanger, the gas to be dried flowing in a continuous circuit through the gas/gas heat-exchanger, the gas/cooling medium heat-exchanger and the gas/gas heat-exchanger once again.

By a "gas/gas heat-exchanger" is meant a heat-exchanger in which the gas being treated is passed through both the separate flow channels of the heat-exchanger, and by a "gas/cooling medium heat-exchanger" is meant a heat-exchanger in which the gas being treated is passed through one channel of the heat-exchanger while a different cooling medium is passed through the other channel.

A chill-drying device of this kind is known from the German Utility Model Specification No. 7 224 620. This chill-drying device has the advantage that whilst having a low height of construction the condensate formed may collect at a common collection-point, and the chill-drying device, in consequence of the feedback of the gases cooled in the gas/cooling medium heat-exchanger into the gas/gas heat-exchanger, exhibits a high efficiency. However, the two heat exchangers are each in the form of a self-contained unit with the result that a comparatively high structural outlay is required, combined with a corresponding relatively high space-requirement. Furthermore special ducts must be provided in order to connect the two heat-exchanger units together.

The present invention aims at overcoming or substantially eliminating the above disadvantage and accordingly provides a device for chill-drying a gas comprising a pressure vessel, a gas/gas heat-exchanger located within the pressure vessel, a gas/cooling medium heat-exchanger located within the pressure vessel, and channels defined between the heat exchangers and vessel connecting an outlet of the gas/gas heat-exchanger at the lower end thereof with a gas inlet at the top of the gas/cooling medium heat-exchanger, whereby, in use of the device, the gas flows through the gas/gas heat exchanger, through the channels, through the gas/cooling medium heat-exchanger and finally through the gas/gas heat-exchangers again.

Advantageously the gas/gas heat-exchanger has a cross-section in the shape of a segment of a circle the radius of curvature of which corresponds with the radius of curvature of the cylindrical pressure vessel so that the gas/gas heat-exchanger can lie with its curved peripheral surface directly against the inner wall of the pressure vessel and achieve an efficient utilization of space. The heat-exchanger ducts through which the gas to be treated flows preferably runs vertically. In a preferred embodiment the gas/cooling medium heat-exchanger exhibits its conventional rectangular cross-section and lies with one of its boundary surfaces directly against the plane boundary surface of the gas/gas heat-exchanger having a cross-sectional shape of a segment of a circle, so that undesirable empty spaces are avoided. The two corners of the gas/cooling medium heat-exchanger remote from the gas/gas heat-exchanger preferably butt against the inner face of the pressure vessel so that the three plane boundary surfaces of the gas/cooling medium heat-exchanger which are not next to the heat-exchanger insert of the gas/gas heat-exchanger define, in combination with the inner surface of the pressure vessel three cavities having approximately the cross-sectional shape of segments of a circle. The two laterally opposite cavities form channels for flow of gas between the output side of the gas/gas heat-exchanger and the input side of the gas/cooling medium heat-exchanger.

The height of construction of the gas/cooling medium heat-exchanger may be smaller than that of the gas/gas heat-exchanger so that an intermediate filter can be accommodated underneath the gas/cooling medium heat-exchanger, through which the gas to be treated flows on its way back to the second input of the gas/gas heat-exchanger from the output of the gas/cooling medium heat-exchanger.

Figure 2:
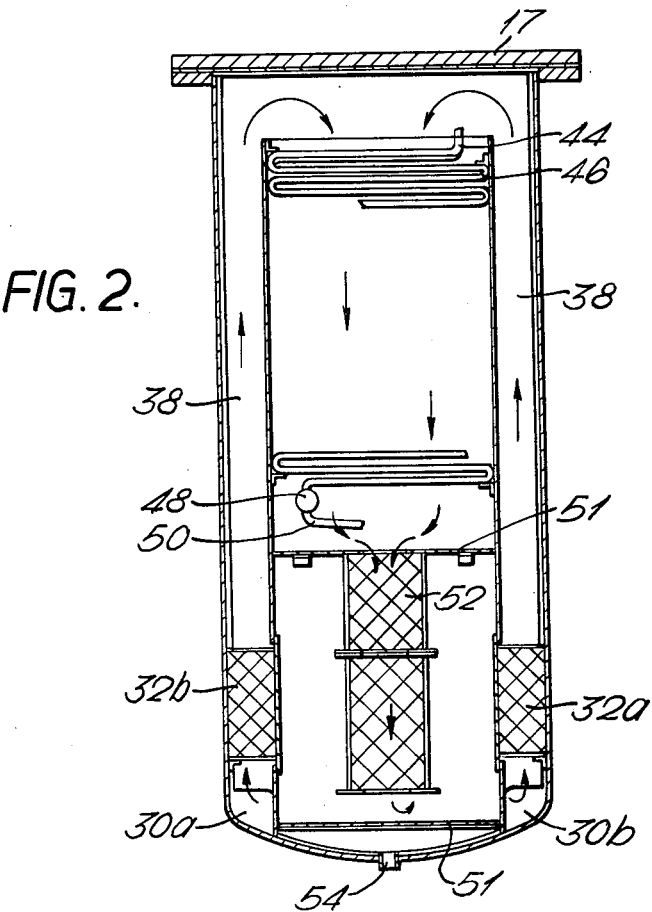
Figure 3:
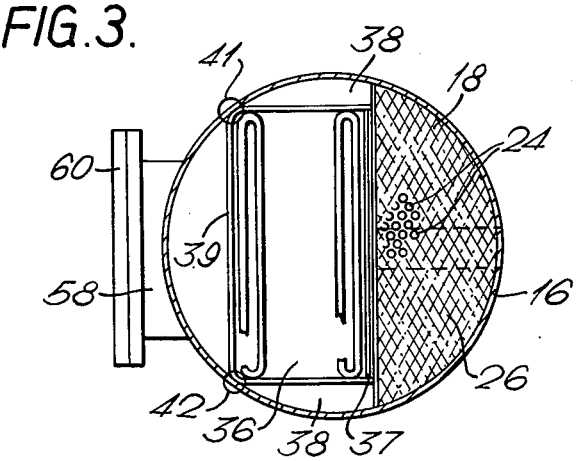

An embodiment of the invention is described below by way of example with reference to the accompanying drawings, in which:

FIG. 1 diagrammatically shows a vertical cross-section through a chill-drying device embodying the invention;

FIG. 2 is a cross-section through the device taken along the line II—II of FIG. 1; and FIG. 3 is a horizontal section through the device taken along the line III—III of FIG. 1.

In detail there can be seen in FIG. 1, a chill-drying device designated as a whole by 10, with a gas/gas heat-exchanger 12 as well as a gas/cooling medium heat-exchanger 14. The two heat-exchanger units are accommodated in a common cylindrical pressure vessel 16 which is closed at the top by a headplate 17. In the zone at the right of FIG. 1 (see also FIG. 3) lies a heat-exchanger insert 18 of the gas/gas heat-exchanger 12, which has a cross-sectional shape of a segment of a circle. The arcuate circumference of this cross-section has the same radius of curvature as that of the cylindrical pressure vessel 16 and the arcuate surface of the insert engages the inner wall of the cylindrical pressure vessel. The plane boundary surface of the heat-exchanger insert which forms a chord of the circle abuts against a plane partition 20 which, in the manner illustrated by FIGS. 1 and 3, extends over the full height and interior width of the pressure vessel 16. The heat-exchanger insert 18 rests on a bracket 22 which is fixed to the partition 20 and to the inner face of the pressure vessel 16, and the insert 18 is partially closed at the top by a headplate 23 which holds the parallel, vertically extending heat-exchanger tubes 24 at equal distances from each other, as schematically indicated in FIG. 3 by the trellis pattern 26. At the bottom end of the heat-exchanger insert 18 a footplate 27 is provided similar to the headplate 23. Between the head and footplates 23, 27 guide plates 25 are arranged at suitable intervals which ensure that the tubes are also maintained at the required spacing between their ends. Above the headplate 23 an inlet opening 28 is provided in the wall of the pressure vessel 16, through which the gas to be treated may be introduced in order to flow, as indicated by the arrows, in the downwards direction through the tubes 24 to an outlet chamber 30 below the footplate 27.

From the outlet chamber 30, the gas to be cooled and hence dried flows to the top inlet opening of a second heat-exchanger insert 36 of a gas/cooling medium heat-exchanger. This heat-exchanger insert 36 has a rectangular cross-section as is illustrated in FIG. 3, so that it can lie with a first plane surface 37 abutting against the plane face of the partition 20. The width of insert 36 is such that the corners 41, 42 opposite to the surface 37 butt against the inner surface of the pressure vessel 16.

The surface 37 and the opposed surface 39 form the longer sides of the rectangle and the two narrow sides of the heat-exchanger insert 36 define, together with an adjacent portion of the inner surface of the pressure vessel 16 and a part of the plane boundary portion covered by the insert surface 37, channels 38 of cross-section approximately the shape of segments of a circle. The channels at their upper ends communicate with the inlet side of the heat-exchanger insert 36 and at their lower ends are connected to the outlet chamber 30. Pre-filters 32a and 32b respectively are provided in the lower portions of the channels 38, so that gas flowing from the outlet chamber 30, which is extended between two transfer zones 30a and 30b, (FIG. 2) has to flow through the pre-filters 32a, 32b before reaching the input of the heat-exchanger insert 36. The heat-exchanger insert 36 has first and second cooling coils 44 and 46 which are bent to and fro in a zigzag manner out of a first plane into a corresponding second plane and back again, so that adjoining cooling-coil elements 44, 46 interengage like a comb and — with maximum utilization of the volume — mutually support one another and hence confer upon the whole cooling-coil pack high mechanical strength. This construction of the insert 36 is known from German Utility Model Specification No. 72 24 260. The bottom ends of the adjoining cooling-coil elements open out into a common collector-duct 48 from which the cooling medium can leave through a drain and be returned to the cooling circuit (not shown).

The heat-exchanger insert 36 is shorter than insert 18 and lies with its top edge above the level of the top edge of the heat-exchanger insert 18 so that underneath the heat-exchanger insert 36 a comparatively large free space is available in which an intermediate filter 52 can be accommodated. A partition-plate 51 located between the bottom of the heat-exchanger insert 36 and the top of the intermediate filter 52 has an opening 51a through which the gas cooled by the heat-exchanger insert 36 can enter the intermediate filter 52, as indicated by the arrow. Next the gas emerges at the bottom of the intermediate filter 52 whence it reverses its direction to reach an opening 53 in the partition wall 20 in order to flow upwards through the interstices between the tubes 24 and then leave the pressure-container through an outlet opening 34 located directly underneath the inlet opening 28. Suitable guideplates 55 and 56 at the top and bottom ends of the gas/cooling medium heat-exchanger 14 ensure that the gas being treated can only move along the described path. Against the outer wall of the pressure-container 16 is located a flanged opening 58 having a lid 60 and through which the interior of the pressure-container is accessible.

In the bottom of the pressure vessel 16 there are provided two drains 54, 57 one being positioned underneath the heat-exchanger 14 and the other underneath the heat-exchanger 12.

The described chill-drying device has all the advantages of a previous chill-drying device such as is known, say, from the German Utility Model Specification No. 7,224,620, but in addition, because of a fundamentally modified construction, has a considerably compacted surface and hence a smaller space-requirement additionally demands less constructional and material outlay, and is enclosed by an essentially smooth, coherent and continuous surface.

What I claim is:

1. A device for chill-drying a gas comprising a pressure vessel having an inner surface, a first gas/gas heat exchanger, located in said pressure vessel and having vertically extending tubes parallel with each other and with the axis of said pressure vessel, said tubes defining first and second independent generally vertical fluid paths each having upper and lower ends and in heat-exchanging relationship, a gas outlet at said lower end of said first path and a gas inlet at said lower end of said second path, a second gas/cooling medium heat-exchanger located in said pressure vessel and extending vertically alongside said first heat-exchanger and having two independent fluid paths in heat-exchanging relationship, each of said fluid paths of said second heat-exchanger being generally vertical and having upper and lower ends, a gas inlet at said upper end and a gas outlet at said lower end of one of said fluid paths of said second heat-exchanger, and channels defined between said first and second heat-exchangers and said inner surface of said pressure vessel for connecting said gas outlet of said first heat-exchanger with the said gas inlet of said second heat-exchanger, and means for connecting said gas outlet of said second heat-exchanger with said gas inlet of said first heat-exchanger whereby in use of the device the gas to be treated flows through said first path of said first heat-exchanger, through said channels, through one of said paths of said second heat-exchanger and finally through said second fluid path of said first heat-exchanger so that the first and second heat-exchangers are contained in said common pressure vessel which serves the function of two individual pressure vessels and connecting tubes.

2. A device as claimed in claim 1, wherein said pressure vessel is cylindrical, said first heat-exchanger has a cross-section the shape of a segment of a circle with a radius of curvature the same as that of said inner surface of said pressure vessel, said first heat-exchanger having a curved surface lying against said inner surface of said pressure vessel and a planar surface, said second heat-exchanger is rectangular in cross-section with surfaces defining pairs of opposed long and short sides and corners between adjacent ones of said long and short sides, the surface of said second heat-exchanger defining one said long side abuts against said planar surface of said first heat-exchanger, and said corners of said second heat-exchanger opposite said one long side abut against said inner surface of said pressure vessel.

3. A device as claimed in claim 2, wherein said first and second heat-exchangers have respective upper and lower ends, said upper end of said second heat-exchanger is located above said upper end of said first heat-exchanger, said second heat-exchanger is shorter than said first heat-exchanger, a filter is located in said pressure vessel beneath said second heat exchanger, the said one fluid path of said second heat-exchanger having a gas outlet at said lower end of said second heat-exchanger, and said other fluid path of said first heat-exchanger having an inlet at said lower end of said first heat-exchanger, whereby gas flows from said second heat-exchanger through said filter to said first heat-exchanger.

4. A device as claimed in claim 1, wherein said channels have respective upper and lower ends, and filters are located within the channels at their said lower ends.

5. A device as claimed in claim 1, wherein said pressure vessel has an opening for access to the interior of said vessel, and a lid is provided for normally closing said opening.

* * * * *